(12) United States Patent
Li et al.

(10) Patent No.: US 9,957,444 B2
(45) Date of Patent: May 1, 2018

(54) APPARATUS FOR PYROLYSING CARBONACEOUS MATERIAL

(71) Applicant: Renergi Pty Ltd, Subiaco, Western Australia (AU)

(72) Inventors: Chun-Zhu Li, Cottesloe (AU); Richard Gunawan, East Victoria Park (AU); Li Dong, Willetton (AU)

(73) Assignee: RENERGI PTY LTD, Subiaco, Western Australia (AU)

( * ) Notice: Subject to any disclaimer, the term of this patent is extended or adjusted under 35 U.S.C. 154(b) by 50 days.

(21) Appl. No.: 15/102,743

(22) PCT Filed: Dec. 16, 2014

(86) PCT No.: PCT/AU2014/001137
§ 371 (c)(1),
(2) Date: Jun. 8, 2016

(87) PCT Pub. No.: WO2015/089556
PCT Pub. Date: Jun. 25, 2015

(65) Prior Publication Data
US 2016/0312124 A1    Oct. 27, 2016

(30) Foreign Application Priority Data

Dec. 16, 2013    (AU) ................ 2013904913

(51) Int. Cl.
*C10B 47/32*    (2006.01)
*C10J 3/66*    (2006.01)
(Continued)

(52) U.S. Cl.
CPC .......... *C10B 47/32* (2013.01); *C10B 5/20* (2013.01); *C10B 51/00* (2013.01); *C10B 53/02* (2013.01);
(Continued)

(58) Field of Classification Search
CPC ........................... C10B 47/32–47/48
See application file for complete search history.

(56) References Cited

U.S. PATENT DOCUMENTS

| 1,415,846 | A | * | 5/1922 | Smith | ...................... | C10B 7/02 |
| | | | | | | 202/118 |
| 1,598,217 | A | * | 8/1926 | Odell | ...................... | C10L 31/04 |
| | | | | | | 201/20 |

(Continued)

FOREIGN PATENT DOCUMENTS

DE    10 2099 053059    5/2011
WO    WO 96/032163    10/1996
(Continued)

OTHER PUBLICATIONS

Supplemental Search European report dated Jun. 6, 2017 in corresponding European Application No. EP 14 87 1164.
(Continued)

*Primary Examiner* — Matthew J Merkling
(74) *Attorney, Agent, or Firm* — G. Peter Nichols; Brinks Gilson & Lione

(57) ABSTRACT

An apparatus for pyrolyzing a carbonaceous material and producing char and volatiles includes a vessel having an inlet for the carbonaceous material, an outlet for the char and the volatiles, and a first pathway therebetween. The vessel has wall portions with interior surfaces that define the first pathway. Further, the vessel has a heat exchange medium inlet, outlet and a second pathway therebetween. The first and second pathways are in heat exchange proximity to each other and the second pathway is defined by interior surfaces of the, or other, wall interior portions of the vessel. At least some of the interior wall portions of the vessel project into an interior space of the vessel such that at least one of the first and second pathways is non-linear.

28 Claims, 3 Drawing Sheets

(51) Int. Cl.
  *C10K 1/32* (2006.01)
  *C10B 51/00* (2006.01)
  *C10B 53/02* (2006.01)
  *C10B 5/20* (2006.01)
  *C10L 9/08* (2006.01)

(52) U.S. Cl.
  CPC *C10J 3/66* (2013.01); *C10K 1/32* (2013.01); *C10L 9/083* (2013.01); *C10J 2300/094* (2013.01); *C10J 2300/0909* (2013.01); *C10J 2300/0916* (2013.01); *C10J 2300/1884* (2013.01); *Y02E 50/14* (2013.01); *Y02E 50/15* (2013.01)

(56) References Cited

U.S. PATENT DOCUMENTS

| | | | | |
|---|---|---|---|---|
| 1,972,929 | A * | 9/1934 | Fisher | C10L 31/10 202/118 |
| 2,069,421 | A * | 2/1937 | Salerni | C10L 37/10 123/196 AB |
| 3,800,865 | A | 4/1974 | Onarheim | |
| 4,123,332 | A * | 10/1978 | Rotter | C10L 37/10 201/15 |
| 4,308,103 | A * | 12/1981 | Rotter | C10L 37/10 201/25 |
| 2007/0043246 | A1* | 2/2007 | Bridle | C10B 47/32 585/240 |
| 2008/0223268 | A1 | 9/2008 | Gehring | |
| 2009/0250378 | A1* | 10/2009 | Wu | C09C 1/482 208/132 |
| 2010/0032279 | A1* | 2/2010 | Robertson | C10B 47/44 202/222 |
| 2013/0067806 | A1 | 3/2013 | Brock | |
| 2013/0240343 | A1* | 9/2013 | Wolfe | C10J 3/007 201/5 |

FOREIGN PATENT DOCUMENTS

| | | |
|---|---|---|
| WO | WO 97/044410 | 11/1997 |
| WO | WO 02/072731 | 9/2002 |
| WO | WO 2012/012823 | 2/2012 |

OTHER PUBLICATIONS

International Search Report dated Jan. 13, 2015 out of foreign priority Application No. PCT/AU2014/001137 (3 pages).
Written Opinion dated Jan. 13, 2015 out of foreign priority Application No. PCT/AU2014/001137 (4 pages).

* cited by examiner

APPARATUS FOR PYROLYSING CARBONACEOUS MATERIAL

This application claims priority to International Application No. PCT/AU2014/001137 filed Dec. 16, 2014 and to Australian Application No. 2013904913 filed Dec. 16, 2013; the entire contents of each are incorporated herein by reference.

FIELD OF THE INVENTION

An apparatus for pyrolysing carbonaceous material is disclosed. Particularly, though not exclusively, an apparatus is disclosed for pyrolysing a low-rank carbonaceous material such as biomass and coal. The apparatus can also carry out the function of a feeder.

BACKGROUND OF THE INVENTION

The main aim of gasification is to convert the chemical energy embedded in a solid fuel into the chemical energy of a resulting gaseous fuel. The conversion efficiency is not 100%, mainly because gasification has to be carried out at an elevated temperature. The raw feed material and the gasifying agents must be heated up to elevated temperature, which are endothermic processes. The actual conversion of a solid fuel into a gaseous fuel may be exothermic or endothermic, depending largely on the oxygen consumption. After gasification, the gaseous fuel must be cooled down, which is an exothermic process. Some of the sensible heat and latent heat embedded in the gaseous fuel cannot be entirely recovered as useful energy. Therefore, the mismatch (gap) between the sum of the (endothermic) heat demand for heating up the reactants and for gasifying the solid fuel and the exothermic heat released by cooling down the gaseous fuel is a major source of inefficiency. For a gasification process to be operated at a commercial scale, burning part of the fuel with air (oxygen) is the common practice to meet this energy gap.

There are two major types of strategies to improve the efficiency of the gasification process. On one hand, the gasification temperature may be reduced with concurrent minimization of oxygen consumption. This particular strategy is generally limited by the reaction kinetics of the gasification process as determined by the composition of the carbonaceous material, especially the gasification of char, as well as the presence of tar residue in the gaseous fuel. For the gasification of low-rank fuels such as biomass, a major limiting factor to achieving fast gasification rates is the adverse effects of volatile-char interactions.

The second strategy to improve the gasification efficiency is to recuperate the thermal energy in the product gas into the chemical energy of the gaseous fuel. The recuperation of thermal energy is a process to increase energy. In the operation of a commercial gasifier, this means finding ways to heat up the fuels and gasifying agents and/or to meet the energy demands of endothermic pyrolysis/gasification/reforming reactions by using the sensible/latent heat of the hot product gas stream. Low-rank fuels such as biomass have very high reactivity and can be gasified at a much lower temperature than that of a high-rank fuel. Therefore, the gasification of low-rank fuels offers an excellent opportunity to recuperate low-temperature (i.e. low grade) heat into the chemical energy of the gasification fuel gas.

There are three categories of pyrolysers, based on the mode of heat supply.

The first category is to use a heat carrier that is physically mixed with the feed material. Conventionally, a fluidized-bed pyrolyser employs direct heat supply by physical mixing. An inert hot gas stream may be used as the heat carrier and is rapidly mixed with a feed material, such as biomass, (and optionally sand) to pyrolyse the feed material. These types of pyrolysers are not very suitable for recuperating the thermal energy in the gasification product gas because the gasification product gas would be excessively diluted by the inert gas, leading to very low heating values of the gasification product gas and subsequent difficulties for its combustion in the downstream gas engine for electricity generation (or combined heat and power generation, CHP).

Some pyrolysers are configured for direct chemical heating, whereby heat for drying biomass, heating of biomass or pyrolysis, or part of it, is performed by exothermic reactions between the feed material (or pyrolysis products) and oxygen (air). The most important advantage is that large amounts of heat can be supplied rapidly. When cold feed material is fed into a gasifier directly, a significant fraction of the thermal energy to dry, heat up and pyrolyse the feed material may be supplied in this way. For a standalone pyrolyser, however, care must be taken to carefully manage the associated safety issues to avoid the presence of possible explosive mixtures in a cold region.

The third category of pyrolysers is configured to employ indirect heat supply via a heat exchanger. Typically, such pyrolysers take the form of a screw (auger) pyrolyser which is heated externally. While this category of pyrolyser may be suitable, in principle, for recuperating the thermal energy in the product gas into the chemical energy of the gaseous fuel, as outlined above, currently available pyrolysers suffer from a limited amount of heat exchange area.

In addition for pyrolysis to be part of gasification (or even combustion), pyrolysis is also a route of processing solid fuels, e.g. to produce bio-oil, biogas and biochar. In practical operations, minimizing the use of an inert carrier gas or solid is important for maximizing the overall process efficiency and economy. Indirect heating offers significant benefits; however, the provision of abundant heat transfer surface area remains a technical challenge.

Bio-oil is a pyrolysis product with exceedingly complicated composition. For improving the efficiency of bio-oil upgrading (biorefinery), it would be beneficial if bio-oil components released at the early stages of pyrolysis can be separated from those released at the later stages.

Solid handling and transferring are a significant task in carrying out the pyrolysis of solid fuels. A feeder is normally needed to add the feedstock into the pyrolyser. Additional mechanisms are also required to transfer the pyrolysing solid feedstock and products across the pyrolyser. Integrating the various solid handling and transferring mechanisms would result in improved process efficiency and economy.

There is therefore a need for technological advancement.

Any references to background art do not constitute an admission that the art forms a part of the common general knowledge of a person of ordinary skill in the art. The above references are also not intended to limit the application of the apparatus as disclosed herein.

SUMMARY OF THE INVENTION

Generally, an apparatus for pyrolysing a carbonaceous material is disclosed. The apparatus can also carry out the function of a feeder.

In accordance with one aspect of the present invention, there is provided an apparatus for pyrolysing a carbonaceous material and producing char and volatiles, the apparatus comprising:

a vessel having an inlet for the carbonaceous material, an outlet for the char and the volatiles and a first pathway therebetween, the vessel having wall portions with interior surfaces that define the first pathway, the vessel further having a heat exchange medium inlet, a heat exchange medium outlet and a second pathway therebetween, the first and second pathways being in heat exchange proximity to each other and the second pathway being defined by interior surfaces of the, or other, interior wall portions of the vessel, at least some of the interior wall portions of the vessel projecting into an interior space of the vessel such that at least one of the first and second pathways is non-linear and a heat transfer surface area is increased compared to linear first and second pathways; and an agitator for passing the carbonaceous material, the produced char and the volatiles through the first pathway.

In one embodiment, the heat exchange medium passes in counter-current direction to the carbonaceous material.

At least portions of the first pathway may be interleaved with at least portions of the second pathway.

In an alternative embodiment, the heat exchange medium passes in co-current direction to the carbonaceous material.

In one embodiment, the projecting wall portions are spaced apart at intervals from one another and are in substantially parallel alignment.

In one embodiment, the plurality of wall portions projecting into the space is configured such that the second pathway is corrugated. In particular, the second pathway may comprise a series of alternating U-shaped and inverted U-shaped turns. In one example, the projecting wall portions are hollow plates having front and rear surfaces and end surface. A baffle may be projecting into a void defined by front and rear and end surfaces, from the interior surface of the vessel, which defines an inverted U-shaped second pathway within each void.

Additionally or alternatively, a stream of air or other oxidising agents may be introduced into the apparatus to react with the pyrolysing carbonaceous material and the product volatiles and char to meet the heat demand in the pyrolyser.

In one embodiment, the agitator comprises a rotatable shaft extending through the vessel and a plurality of paddles associated with the rotatable shaft, wherein one or more paddles extend into respective interconnected chambers.

The apparatus of an embodiment of the invention may be readily integrated with a gasifier for the reforming of volatiles and the gasification of char produced in said apparatus.

Accordingly, in another aspect of the invention there is a gasification system for producing product gas from a carbonaceous material comprising a pyrolyser as defined above for pyrolysing carbonaceous material and producing volatiles and char, the apparatus being in fluid communication with a gasifier, or integrated with the gasifier, for receiving, reforming and gasifying said volatiles and char from said pyrolyser to produce raw product gas.

The gasification system may further comprise an apparatus for cleaning raw product gas, said apparatus being arranged in fluid communication with the gasifier to receive and clean the raw product gas.

The inlet for the carbonaceous material may be one of a plurality of inlets for the carbonaceous material. Further, the outlet for the char and the volatiles may be one of a plurality of outlets for the char and the volatiles. In one embodiment the vessel comprises at least one outlet for the char and at least one outlet for the volatiles.

Further, the heat exchange medium inlet may be one of a plurality of heat exchange medium inlets and the heat exchange medium outlet may be one of a plurality of heat exchange outlets.

DESCRIPTION OF THE FIGURES

Notwithstanding any other forms which may fall within the scope of the apparatus as set forth in the Summary, specific embodiments will now be described, by way of example only, with reference to the accompanying drawings in which.

DETAILED DESCRIPTION OF SPECIFIC EMBODIMENTS

Figure 1:
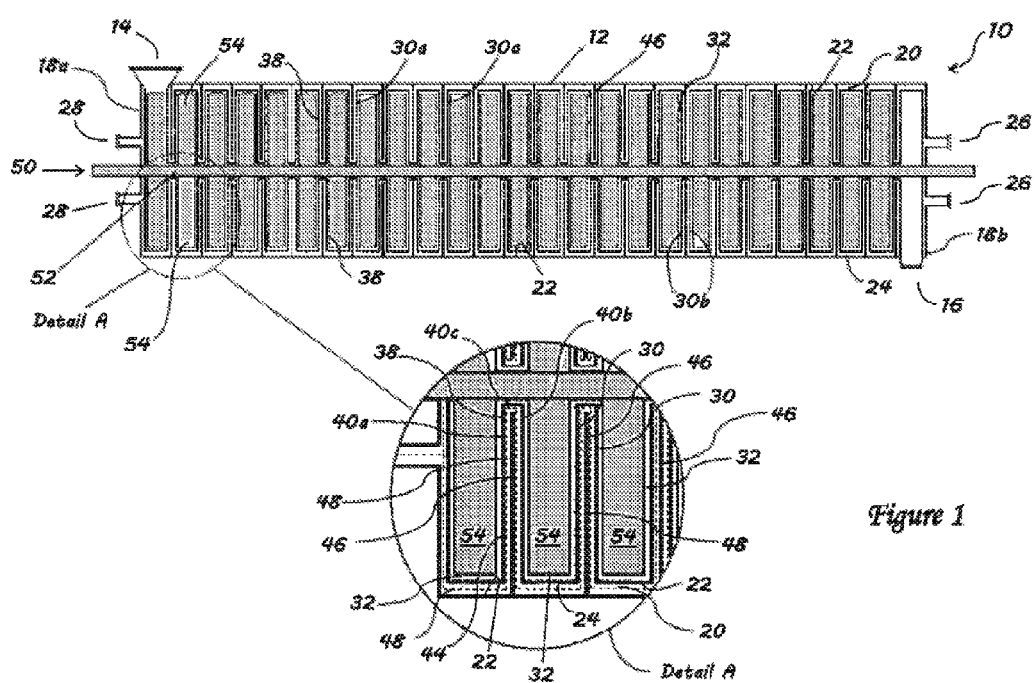
FIG. 1 is a longitudinal cross-sectional schematic representation of an apparatus for pyrolysing carbonaceous material in accordance with the disclosure.
Figure 2:
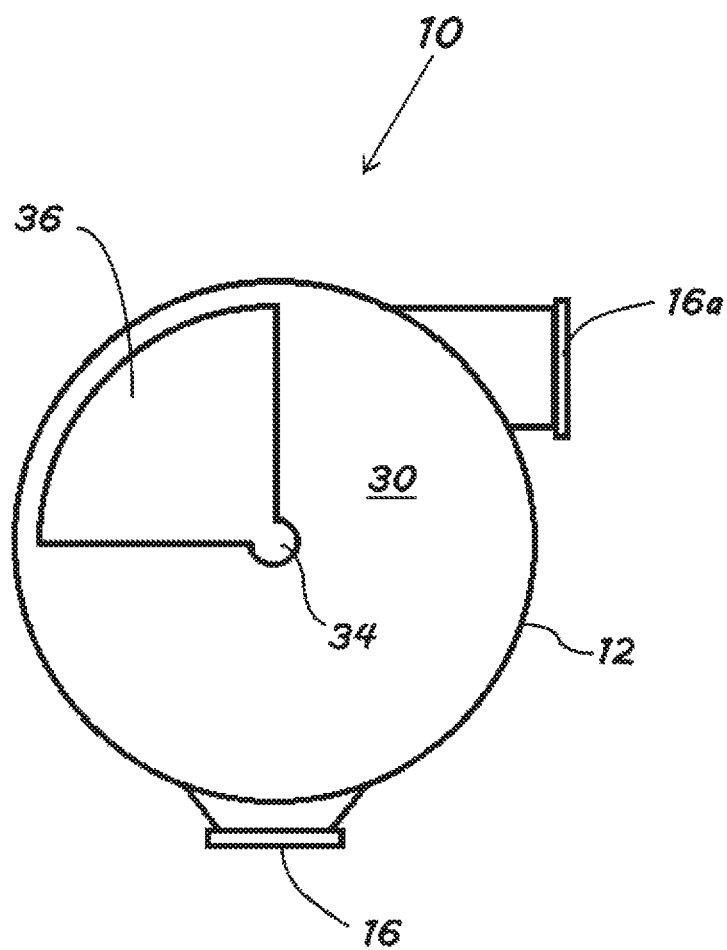
FIG. 2 is a side-view schematic representation of the apparatus shown in FIG. 1; and, FIG. 3 is a schematic representation of a gasification system including the apparatus of FIGS. 1 and 2 in accordance with the disclosure.
Figure 3:
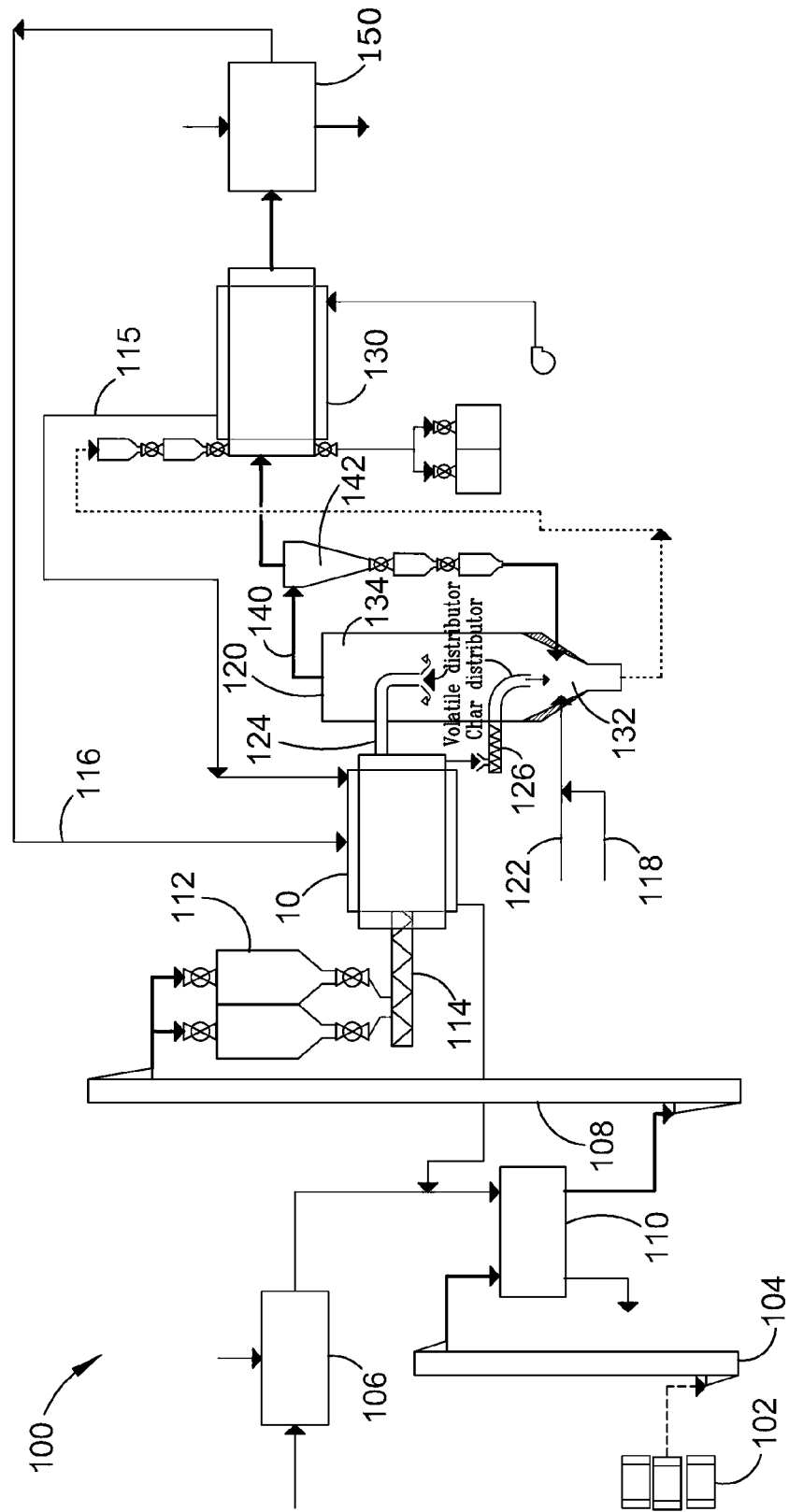

Embodiments of the present invention relate to an apparatus 10 for pyrolysing a carbonaceous material with reference to FIGS. 1, 2 and 3.

The term 'carbonaceous material' is used broadly throughout this specification and includes, but is not limited to, coal such as anthracite, semi-anthracite, bituminous coal, sub-bituminous coal, brown coal, lignite and peat, biomass, waste rubber including but not limited to vehicle tyres, waste plastic materials, agricultural waste, mixtures thereof and mixtures of said carbonaceous materials with other substances. The apparatus of the embodiment of the invention described with reference to FIGS. 1 to 3 is particularly suitable for use with low-rank carbonaceous material having high volatile matter yields such as biomass.

The term 'pyrolysing' or 'pyrolysis' refers to the thermochemical decomposition of a carbonaceous material, at elevated temperatures in an atmosphere with little or no oxygen, into volatile organic compounds and a solid residue richer in carbon, commonly referred to as char. In the broadest sense within this disclosure, torrefaction may also be considered as one special type of pyrolysis taking place at a lower temperature.

The apparatus 10 for pyrolysing carbonaceous material includes a vessel 12 having an inlet 14 for carbonaceous material and an outlet 16 for char and volatiles. In general the vessel 12 is a horizontally disposed cylindrical vessel.

The inlet 14 and outlet 16 are disposed at opposing ends 18a, 18b of the vessel 12. Preferably, the inlet 14 may be disposed on an upper surface of the vessel 12 in connection with a hopper or a feeder (not shown).

The outlet 16 may be disposed on a lower surface of the vessel 12 in connection with a discharging device. The discharging device may take the form of a rotary valve or a similar device to minimize blockages and to help to control the flow rate of carbonaceous material and the resulting char through the vessel 12. In some embodiments, the vessel 12 may be provided with a separate outlet 16a disposed on an upper surface at the end 18b of the vessel 12 for withdrawing volatiles, steam and char fines entrained therein.

It will be appreciated that the outlet(s) 16, 16a may be arranged in connection with a gasifier (see FIG. 3) for gasifying the char and reforming the volatiles received therein.

The apparatus 10 also includes a hollow casing 20 associated with an interior surface 22 of the vessel 12. The hollow casing 20 is configured to define a heat exchange pathway 24 for a heat exchange medium between inlets 26 and outlets 28 disposed at opposing ends 18b, 18a of the vessel 12, respectively.

Additional inlets and/or outlets (not shown) in between inlets 26 and outlets 28 may also be provided when more than one stream of heat exchange medium are used especially when they are at different temperatures and/or when it is necessary to adjust the temperature profile along the heat exchanger. Preferably, the inlet 26 is disposed at end 18b of the vessel 12 opposite to the inlet 14 for carbonaceous material so that the heat exchange medium circulates through the hollow casing 20 in an overall counter-current direction to the carbonaceous material. In alternative embodiments, a co-current configuration is possible.

The hollow casing 20 is also configured to provide a plurality of surfaces 30 projecting into the vessel 12 to define a series of interconnected chambers 32 therein. The projecting surfaces 30 are spaced apart at regular intervals from one another, preferably in substantially parallel alignment.

The projecting surfaces 30 may be annulus-shaped to define a substantially circular passage 34 disposed through a central longitudinal axis of the vessel 12. Alternatively, the projecting surfaces 30 may comprise a pair of hemi-annulus-shaped surfaces 30a, 30b arranged to project in lateral alignment with one another from opposing sides of the vessel 12.

As shown in FIG. 2, the projecting surface 30 may be provided with an opening 36 to facilitate the flow of carbonaceous material and the resulting char and volatiles progressively through adjacent chambers 32 in the vessel 12 from the inlet 14 to the outlet 16. In the embodiment shown in FIG. 2, the opening 36 is quadrant-shaped. It will be appreciated that the opening 36 may be sized and shaped in various modes.

The openings 36 in adjacent projecting surfaces 30 may be arranged in substantially longitudinal alignment with one another to define a quadrant-shaped passage extending through the vessel 12. Alternatively, the apertures 36 in adjacent projecting surfaces 30 may be arranged progressively at varying angles of rotation with respect to one another.

As shown in Detail A of FIG. 1, the projecting surfaces 30 of the hollow casing 20 may take the form of hollow plates 38 having front and rear surfaces 40a, 40b and end surface 40c. Projecting into a void 44 defined by front and rear surfaces 40a, 40b and end surface 40c, from the interior surface 22 of the vessel 12, is a baffle 46 which defines an inverted U-shaped heat exchange pathway 48 within each void 44.

Advantageously, the plurality of projecting surfaces 30 as described in the preceding paragraphs increases the heat transfer surface area of said apparatus 10 in comparison with prior art pyrolysers. In one example, the total heat transfer surface area of said apparatus 10 may be 3-4 times the heat transfer surface area of a jacketed tubular reactor.

Furthermore, the U-shaped heat exchange pathway 48 increases the turbulence of the heat exchange medium as it flows through the hollow casing 20, thereby greatly enhancing the heat transfer coefficient and therefore the heat transfer rate of the heat exchange medium to the carbonaceous material and resulting char and volatiles. It will be appreciated that the projecting surfaces 30 in the vessel 12 also increase the turbulence of gases within the vessel 12 as the pyrolysing carbonaceous material and resulting char and volatiles move progressively through the vessel 12.

It is thought that the carbonaceous material may be heated in said apparatus 10 by various heat transfer mechanisms including: direct contact (heat conduction) with the projecting surfaces 30 and the interior surface 22 of the vessel 12, contact with gas and volatiles within the vessel (convection) that has been heated by heat transfer with the projecting surfaces 30 and the interior surface 22 of the vessel 12, and by heat radiation from the projecting surfaces 30 and the interior surface 22 of the vessel 12.

The apparatus 10 also includes an agitator 50 for transferring carbonaceous material through the series of interconnected chambers 32 in the vessel 12 from said inlet 14 to said outlet 16.

The agitator 50 may comprise a rotatable shaft 52 extending through the circular passage 34 of the vessel 12 and a plurality of paddles 54 associated with the rotatable shaft 52. One or more of the paddles 54 extend from the rotatable shaft 52 into respective interconnected chambers 32. The paddles 54 are operable by rotation of the rotatable shaft 52. It will be appreciated that the paddles 54 will be shaped and sized to be suitably accommodated in the respective interconnected chambers 32, to allow free movement of the paddles 54 within the respective chamber 32 and minimise 'dead zones' within the chambers 32 to avoid pyrolysing carbonaceous material or char from becoming trapped within the chamber 32. It will be appreciated that the agitator may be provided with a motor to control the speed of the rotation of the rotatable shaft 52.

The speed of rotation of the rotatable shaft 52 may be changed to vary the residence time of the pyrolysing carbonaceous material and the resulting char in the interconnected chambers 32. Alternatively, the vessel 12 may be inclined (e.g. tilted) at an angle with respect to the horizontal. The residence time of the pyrolysing carbonaceous material and the resulting char may be varied by changing the angle of inclination. In these ways, the residence time of the carbonaceous material in the apparatus 10 may be controlled to allow a sufficient period for the carbonaceous material to be substantially converted to char and volatiles that can be formed at a given temperature.

Despite the flow turbulence at a small scale within each interconnected chamber 30 of the apparatus 10, the overall flow of char and volatiles through the apparatus 10 is substantially 'plug-flow', giving rise to relatively narrow residence time distribution for the volatile products. The residence time may also be adjustable if additional inert gas is used.

In some embodiments of the invention, the apparatus 10 may be adapted to have an inlet (not shown) for air, pure oxygen or an oxidising gas. In these particular embodiments, air, pure oxygen or the oxidising gas may be introduced into the apparatus 10 to facilitate partial combustion reactions with the carbonaceous material, volatiles and/or char to generate additional heat.

In further embodiments of the invention, the apparatus 10 may be adapted further to grind or crush the carbonaceous material simultaneously with pyrolysing the carbonaceous material, as it flows through the vessel 12 from the inlet 14 to the outlet 16 of the apparatus 10. In these particular embodiments, the apparatus 10 may include a grinding medium comprising a plurality of freely movable elements (e.g. hard objects). The freely moving elements may take the form of balls, the balls typically (but not restricted to) having a diameter ranging from about 10 mm to about 120 mm and made from various hard materials including steel and silica. The grinding medium may be mixed with the carbonaceous material before or after the carbonaceous material is introduced to the apparatus 10 via inlet 14. The grinding medium may be fed into the apparatus 10 in other means. The grinding medium may remain in the apparatus 10. By rotating the rotatable shaft 52 of agitator 50, the paddles impart momentum to the grinding medium and cause the grinding medium to repeatedly impact the carbonaceous material. The grinding medium may also advantageously contribute to mass-heat transfer effects within the apparatus 10.

In use, carbonaceous material such as biomass may be introduced to said apparatus 10 via inlet 14 of the vessel 12. It will be appreciated that the carbonaceous material may be dried to a predetermined moisture content (e.g. <20% w/w) prior to being introduced into the vessel 12. The carbonaceous material is progressively transferred through the interconnected chambers 32 of the vessel 12 from one end 18a to an opposing end 18b thereof by rotating the rotatable shaft 52 of the agitator 50. The paddles 54 within the interconnected chambers 32 move the carbonaceous material within the chamber 32 until the carbonaceous material encounters the opening 36 in the projecting surface 30, through which opening 36 some of the carbonaceous material passes into the adjacent chamber 32.

Heat for pyrolysis is indirectly supplied by a heat exchange medium which flows from the inlet 26 to the outlet 28 through the heat exchange pathway 24 defined in the hollow casing 20 of the vessel 12. Additional heat to meet the heat requirement of the processes and reactions in vessel 12 may be supplied by introducing air, pure oxygen or an oxygen-containing gas into the vessel 12 to facilitate partial combustion reactions with the carbonaceous material, volatiles and/or char.

The resulting char and volatiles may be withdrawn through outlets 16, 16a. It will also be appreciated that by reducing the operating temperature to less than 300° C., said apparatus 10 may be conveniently used as a dryer or a torrefaction unit.

Advantageously, the apparatus 10 may be operated to facilitate drying, steam generation, pyrolysis and further thermal cracking of the pyrolysis products, in particular if the carbonaceous material has a significant moisture content (e.g. about 20% w/w). The steam generated in the apparatus 10 from the moisture in the carbonaceous material may be withdrawn with the volatiles through outlet 16a. The inventors consider that this would provide a source of steam for volatile reforming reactions in a downstream volatile reforming process. Accordingly, for many types of biomass with a natural moisture content of about 20% w/w (e.g. some straw), a dedicated dryer for drying the biomass prior to introduction to the vessel 12 may not be required.

Furthermore, the apparatus 10 may also be conveniently employed (in part) as a feeder. For example, biomass may be fed into the apparatus 10 from a hopper placed directly above the inlet 14 of the vessel 12 without the need for a dedicated screw feeder. The rotating paddles 54 will transfer the pyrolysing biomass from the inlet 14 to the outlet 16 of the vessel 12.

In another embodiment, the agitator 50 is provided with short sections of screws within the vessel 12 at the sides 18a and even 18b to facilitate the transfer of solid carbonaceous material into and out of the vessel 12. Any type of screws known to those skilled in the field now and future may be used for this purpose.

Referring to FIG. 3, there is shown one embodiment of a gasification system 100. The gasification system 100 includes a dryer 110 for partially or completely drying carbonaceous material, such as biomass, the pyrolyser 10 as described previously for heating the (partially) dried carbonaceous material to a suitable temperature e.g. in a range of about 250° C. to about 850° C. and producing char and volatiles, a gasifier 120 for gasifying the char and reforming the volatiles to produce a raw product gas, and an apparatus 130 for cleaning raw product gas. Said apparatus 130 is arranged in fluid communication, preferably via a cyclone 142, with the gasifier 120 to receive and clean the raw product gas.

The gasification system 100 may be employed as described below. Biomass (or an alternative carbonaceous material) is transferred from a storage hopper 102, e.g. via a bucket elevator 104 which is arranged to feed biomass to dryer 110. The dryer 110 employs a hot air stream or other medium to dry the biomass. Preferably, the hot air stream comprises waste heat streams derived from any of the various components in the gasification system 100. Alternatively, and in particular in start-up mode, the hot air stream may be derived from the combustion of natural gas or other fuels with air in a direct air heater 106.

Dried or partially dried biomass exiting the dryer 110 is then transferred e.g. by bucket elevator 108, to parallel hoppers 112 (or other types of hoppers). A screw feeder 114 feeds dried biomass from the parallel hoppers 112 into the pyrolyser 10. Said screw feeder 114 is not always necessary because the pyrolyser 10 can also act as a feeder. The pyrolyser 10 heats the dried biomass to produce volatiles (including water vapour) and solid particles of char, as described previously. The heat exchange medium used for the pyrolyser 10 may be obtained via conduit 115 from a heat exchanger of the apparatus 130 for cleaning raw product gas, thereby recuperating the sensible heat of a raw product gas recovered during gas cleaning. Additionally, or alternatively, flue gas via conduit 116 from the gas engine 150 may deliver the or some heat demand for the pyrolyser 10.

Steam and air are delivered to the gasifier 120 via lines 118 and 122. Volatiles and entrained fine particles from the pyrolyser 10 enter the gasifier 120 via conduit 124 that is connected to outlet 16a. Char particles exit the pyrolyser 10 and are fed into the gasifier 120 via feeder 126. The gasifier 120 may be provided with an auxiliary burner (not shown) which combusts natural gas or other fossil fuels to provide additional heating load and/or in start-up mode.

In another embodiment, the pyrolyser 10 is integrated with the gasifier 120 into a single vessel and the conduit 124 and the feeder 126 are no longer necessary. The outlets 16 and 16a are within the gasifier 120.

After entering gasifier 120, large char particles descend to a lower portion 132 of the gasifier 120 and the volatiles (and some entrained char fines) ascend to an upper portion 134 of the gasifier 120 where they undergo reforming reactions. The char particles react with an oxygen-containing gas, in the form of air, diluted or pure oxygen, to produce mainly carbon monoxide (CO) and carbon dioxide ($CO_2$) together with minor amounts of other gases which subsequently ascend to the upper portion of the gasifier 120 and mix with the volatiles and reformed gas to produce a raw product gas. The separation of volatile reforming reactions and char gasification as described minimizes the adverse effects of volatile-char interactions, thereby accelerating the gasification of char. This arrangement also minimizes unnecessary contact of volatiles with the oxygen-containing gas to reduce consumption of the oxygen-containing gas.

In one embodiment, a conduit connecting with conduit/feeder 126 (or outlet 16 directly) is provided within the gasifier to bring the char particles close to the bottom portion of the gasifier. The lower portion of the gasifier is conically shaped so that the char particles are kept within the lower portion of the gasifier to ensure that they have sufficient lengths of residence time to react with oxygen and other gasifying agents. The conical angle can be calculated, using formulas known to those skilled in the field or using a computer software package (e.g. a computational fluid dynamics software package), from the terminal velocity of fine particles (i.e. avoidance of fine particle entrainment) by also considering that their residence time should be longer than the burnout time under the perceived conditions. The sizes of the fine particles to be retained in this region are chosen based on the particle size distribution of the char particles so that the majority of char particles are retained in the region for reaction with oxygen. While some large ash particles are discharged from the gasifier bottom, ash and unburned char fine particles will be entrained to the upper portion 134 of the gasifier and then transported into the cyclone 142 for separation and collection.

To ensure proper ignition and light off of particles at the lower portion of the gasifier, the gasifying agents from 118 and 122 may be pre-heated prior to their entry into the gasifier. One such way of pre-heating is to pass the gasifying agents through a heat exchanger e.g. a coiled heat exchange tube wrapped outside or inside the gasifier reactor wall. This heat exchange arrangement also contributes to the regulation of the temperature profile of the lower portion of the gasifier. Additionally, the introduction of steam into the lower portion is another way to regulate the reaction temperature at the low portion of gasifier.

Large char particles may be withdrawn from the lower portion 132 of the gasifier 120 for use in the gas cleaning apparatus 130.

The raw product gas exits the gasifier 120 via conduit 140 and enters cyclone 142 where the raw product gas is separated from solid particulates, mainly ash and ungasified char particles.

The raw product gas then enters the gas cleaning apparatus 130. The resulting cleaned product gas will then be used for various purposes such as power generation, hydrogen production and the synthesis of chemicals and fuels.

As described above in detail, embodiments of the present invention provide an efficient gasification method, especially for low-rank carbonaceous materials, to manufacture relatively high quality product gas for purposes such as electricity generation, heat production and chemical synthesis.

Embodiments of the present invention could improve gasification efficiency. The technology can be suitably utilised in, for example, energy and chemical industries.

It will be appreciated that the apparatus 10 of the present invention may be employed in other applications other than gasification. For example, the apparatus 10 may be employed for bio-oil production from the pyrolysis of biomass, as a component of a pyrolysis-bio-refinery biofuel production process. In this particular application, the apparatus may be adapted to include a plurality of outlets 16a for volatiles disposed on the upper surface of the vessel 12, thereby minimizing the occurrence of inter-particle secondary reactions of bio-oil vapour at elevated temperatures and enhancing bio-oil yield.

In view of the 'plug-flow' characteristics of pyrolysis, this particular arrangement of a plurality of outlets 16a may also facilitate the collection of bio-oil into fractions from the pyrolysis of biomass at various temperature intervals. Bio-oil fractions may have quite different chemical compositions and therefore can be bio-refined under different conditions to achieve optimized bio-refinery outcomes. For example, acetic acid may be concentrated in a specific fraction at one or more of the plurality of outlets 16a.

It will be readily apparent to a person skilled in the relevant art that some embodiments of the present invention may provide advantages over the prior art including, but not limited to, the following:

providing a versatile pyrolysis apparatus which can be alternatively used as a drying or torrefaction unit by using low grade waste heat and by having the heat exchange medium flowing through the casing of the apparatus;

providing an efficient pyrolysis apparatus with an increased heat exchange surface area in comparison with prior art pyrolysers to enhance heat exchange efficiency;

providing a pyrolysis apparatus configured to induce gas turbulence in the heat exchange pathway and within the vessel to enhance heat transfer coefficient and therefore heat transfer rate;

combining drying, steam production, pyrolysis and cracking of pyrolysis products with thermal energy recuperation within a single vessel.

providing a pyrolyser apparatus that is configured so that air, oxygen (diluted or pure) or other oxidizing agents can be introduced to react with the pyrolysing carbonaceous material and pyrolysis char/volatiles to supply at least part of the heat demand in the pyrolyser.

providing a pyrolyser apparatus configured to produce bio-oil fractions from the pyrolysis of biomass or other carbonaceous material at different temperature intervals.

providing a pyrolysis apparatus that carries out the functions of pyrolysis and feeding without the need of an additional feeder.

Numerous variations and modifications will suggest themselves to persons skilled in the relevant art, in addition to those already described, without departing from the basic inventive concepts. All such variations and modifications are to be considered within the scope of the present invention, the nature of which is to be determined from the foregoing description. For example, it is to be understood that embodiments of this invention are capable of being practiced and carried out in various ways at both small (a few megawatts or less) and large (a few hundred megawatts) scales.

It will be also understood that while the foregoing description refers to specific sequences of process steps, pieces of apparatus and equipment and their configuration are provided for illustrative purposes only and are not intended to limit the scope of the present invention in any way.

In the description of the invention, except where the context requires otherwise due to express language or necessary implication, the words "comprise" or variations such as "comprises" or "comprising" are used in an inclusive sense, i.e. to specify the presence of the stated features, but not to preclude the presence or addition of further features in various embodiments of the invention.

The invention claimed is:

1. An apparatus for pyrolyzing a carbonaceous material that includes biomass to produce char and volatiles, the apparatus comprising:
   a vessel having an inlet for the carbonaceous material, an outlet for the char and the volatiles and a first pathway therebetween, the vessel further having a heat exchange medium inlet, a heat exchange medium outlet and a second pathway therebetween, the first and second pathways being in heat exchange proximity to each other;
   an agitator rotatably supported within the vessel for passing carbonaceous material, the produced char and the volatiles through the first pathway, the agitator comprising a rotatable shaft and a plurality of paddles spaced apart from each other along the shaft;
   the vessel further comprising an interior wall disposed within an interior space of the vessel and dividing the interior space into the first pathway and the second pathway, the interior wall having interior wall portions projecting between the paddles of the agitator such that the first and second pathways are non-linear and the second pathway is corrugated, wherein the first pathway is disposed between the agitator and the interior wall, and a heat transfer surface area is increased compared to linear first and second pathways.

2. The apparatus according to claim 1, wherein at least portions of the first pathway are interleaved with at least portions of the second pathway.

3. The apparatus according to claim 1, wherein at least some of the interior wall portions are positioned to transfer heat from the heat exchange medium to the pyrolyzing carbonaceous material.

4. The apparatus according to claim 1, wherein the second pathway comprises a series of alternating U-shaped and inverted U-shaped turns.

5. The apparatus according to claim 1, wherein in use an oxidizing agent is introduced to react with the carbonaceous material and the pyrolysis products to generate a part of the heat required in the apparatus.

6. The apparatus according to claim 1, wherein the agitator is operable by rotation of the rotatable shaft.

7. The apparatus according to claim 1, wherein the first pathway comprises interconnected interior spaces.

8. The apparatus according to claim 1, wherein a rotation speed of the agitator or the shaft and an angle of inclination by which the apparatus is disposed with respect to a horizontal plane are controllable to adjust a rate at which the pyrolyzing carbonaceous material and its pyrolysis products are transferred from the inlet to the outlets whereby the apparatus is arranged to function as a feeder and a residence time of the feed carbonaceous material is controllable.

9. The apparatus according to claim 1, wherein screws are attached to, or replace, short sections of the shaft at a front side and an end side of the apparatus to facilitate the transfer of the solid particles into and out of the apparatus.

10. The apparatus according to claim 1, wherein the apparatus is provided with a grinding medium comprising a plurality of freely moving elements to grind, crush and pyrolyze the carbonaceous material simultaneously.

11. The apparatus according to claim 1, wherein the inlet for the carbonaceous material is one of a plurality of inlets for the carbonaceous material.

12. The apparatus according to claim 1, wherein the outlet for the char and the volatiles is one of a plurality of outlets for the char and the volatiles.

13. The apparatus according to claim 1, wherein the vessel comprises at least one outlet for the char and at least one outlet for the volatiles.

14. The apparatus according to claim 1, wherein the heat exchange medium inlet is one of a plurality of heat exchange medium inlets and the heat exchange medium outlet is one of a plurality of heat exchange outlets.

15. The apparatus according to claim 1, wherein the apparatus is provided with a plurality of outlets for volatiles along a length of the apparatus from the inlet to the outlet of carbonaceous materials and condensers to produce bio-oil fractions by cooling down the volatiles.

16. The apparatus according to claim 1, wherein the vessel is arranged such that more than one stream of heat exchange medium can be introduced into the vessel.

17. The apparatus according to claim 1, wherein the vessel is arranged such that more than one stream of heat exchange medium can be withdrawn from the vessel.

18. The apparatus according to claim 1, wherein the apparatus is arranged such that a peak temperature can be controlled in a range suitable for carrying out torrefaction.

19. The apparatus according to claim 1, wherein the apparatus is arranged such that a peak temperature can be controlled in a range suitable for carrying out drying.

20. A gasification system for producing product gas from a carbonaceous material comprising an apparatus as defined by claim 1 for pyrolyzing carbonaceous material and producing volatiles, and char, the apparatus being integrated with a gasifier having respective zones therein for reforming of volatiles and gasification of char to produce a raw product gas, the gasifier being directly coupled with a product gas cleaning zone.

21. The apparatus according to claim 1, wherein the interior wall portions projecting between the paddles have a U-shaped cross-section such that the interior wall portions have opposing surface portions, the second pathway including a void between the opposing surface portions.

22. The apparatus according to claim 21, wherein the vessel further comprises a plurality of baffles each projecting into the void between the opposing surface portions of an interior wall portion of the interior wall.

23. An apparatus for pyrolysing a carbonaceous material and producing char and volatiles, the carbonaceous material including biomass, the apparatus comprising
   a vessel including: (a) an inlet for the carbonaceous material, an outlet for the char and the volatiles, and a first pathway therebetween; and (b) a heat exchange medium inlet, a heat exchange medium outlet, and a second pathway therebetween; and
   an agitator rotatably supported within the vessel for passing carbonaceous material, the produced char and the volatiles through the first pathway, the agitator comprising a rotatable shaft and a plurality of paddles spaced apart from each other along the shaft;
   the vessel further comprising a plurality of baffles, each baffle projecting into an interior space of the vessel between paddles;
   the vessel further comprising an interior wall disposed in the interior space between the paddles and the baffles in a corrugated manner so as to divide the interior space into the first pathway and the second pathway, wherein the first pathway is disposed between the agitator and the interior wall, and the second pathway is disposed between the interior wall and the baffles, such that the first and second pathways are non-linear and in heat exchange proximity to each other.

24. The apparatus according to claim 23, wherein at least portions of the first pathway are interleaved with at least portions of the second pathway.

25. The apparatus according to claim 23, wherein the second pathway comprises a series of alternating U-shaped and inverted U-shaped turns.

26. The apparatus according to claim 23, wherein the rotation speed of the agitator or the shaft and the angle of inclination by which the apparatus is disposed with respect to a horizontal plane are controllable to adjust a rate at which the pyrolyzing carbonaceous material and its pyrolysis products are transferred from the inlet to the outlets whereby the apparatus is arranged to function as a feeder and a residence time of the feed carbonaceous material is controllable.

27. The apparatus according to claim 23, wherein screws are attached to, or replace, short sections of the shaft at a front side and an end side of the apparatus to facilitate the transfer of the solid particles into and out of the apparatus.

28. The apparatus according to claim 23, wherein the apparatus is provided with a grinding medium comprising a plurality of freely moving elements to grind, crush and pyrolyze the carbonaceous material simultaneously.

* * * * *